United States Patent [19]

Somerhausen et al.

[11] Patent Number: 5,096,785
[45] Date of Patent: Mar. 17, 1992

[54] MIRROR AND METHOD OF MANUFACTURING SAME

[75] Inventors: Bernard Somerhausen, Nivelles; Albert Servais, Gerpinnes, both of Belgium

[73] Assignee: Glaverbel, Brussels, Belgium

[21] Appl. No.: 466,918

[22] Filed: Jan. 18, 1990

[30] Foreign Application Priority Data

Jan. 26, 1989 [GB] United Kingdom ............... 8901684

[51] Int. Cl.$^5$ .................................................. G02B 5/08
[52] U.S. Cl. ...................................... 428/626; 428/673; 428/674; 428/912.2; 427/410; 359/884; 359/883
[58] Field of Search ............... 428/621, 626, 673, 674, 428/76, 912.2; 350/641; 427/409, 410

[56] References Cited

U.S. PATENT DOCUMENTS

| | | | |
|---|---|---|---|
| 4,255,214 | 3/1981 | Workens | 148/269 |
| 4,451,597 | 5/1984 | Victorius | 427/409 |

FOREIGN PATENT DOCUMENTS

| | | | |
|---|---|---|---|
| 184701 | 7/1988 | Japan | 428/626 |
| 184702 | 7/1988 | Japan | 428/626 |
| 1074076 | 6/1967 | United Kingdom | |
| 1250142 | 10/1971 | United Kingdom | |
| 2102453 | 2/1983 | United Kingdom | |
| 2132507 | 7/1984 | United Kingdom | 428/912.2 |

*Primary Examiner*—Richard O. Dean
*Assistant Examiner*—George Wyszomierski
*Attorney, Agent, or Firm*—Spencer & Frank

[57] ABSTRACT

A mirror comprises a transparent glass sheet having a reflective metal coating deposited on the glass and a protective coating applied to the reflective coating. The protective coating comprises a paint having a residual internal stress $S_R$ equal to or less than 1 MPa, measured by the Cantilever method (as defined) at a temperature above its glass transition temperature. One suitable paint used in coating the mirror has the following composition:

50% pigments:
    10% titanium dioxide
    45% barium sulphate
    25% talc
    15% lead pigment
    5% coloring pigment and carbon black
15% binder
    100% epoxy resin ester with 45% castor oil
35% solvents
    5% butanol and isobutanol
    95% xylene.

The glass transition temperature of the paint is approximately 10° C., the residual internal stress at 20° C. is approximately 0.05 MPa and the Persoz hardness is approximately 120.

21 Claims, No Drawings

MIRROR AND METHOD OF MANUFACTURING SAME

BACKGROUND OF THE INVENTION

1. Field of the Invention

The present invention relates to mirrors and more particularly to the protection of mirrors against corrosion, especially corrosion at the edges.

The mirrors to which the present description refers comprise in general a glass sheet having a reflective metal coating deposited on the glass surface and a protective coating applied to the reflective metal. Examples of commonly used reflective metals are silver and copper. The protective coating, which commonly comprises a layer of paint, serves in part to prevent abrasion of the reflective metal but more importantly provides the metal with resistance to corrosion. If such anti-corrosion protection is not provided the reflective metal tends to undergo oxidation or attack by atmospheric pollutants, resulting in tarnishing and discolouration and thus a reduction of the specular reflective properties of the mirror. The risk of corrosion is considerably increased if the mirror is used in humid conditions.

2. Description of the Related Art

Despite the presence of such a protective coating premature ageing of mirrors is often observed, either by the appearance of a haze, indicative of a slight oxidation of the metal, or by corrosion of the metal starting from the mirror edges.

No fully satisfactory means of resolving this problem has hitherto been proposed. In the case of a mirror with a copper layer, either used alone as a reflective layer or in combination with a silver layer, it has been proposed to coat the copper with an inhibitor based on an azole composition. Such proposals are for example made in British patent specifications Nos. 1 074 076 (Pittsburgh Plate Glass Co.), 1 250 142 (Shikoku Kasei Kogyo Co. Ltd) and 2 102 453 (Glaverbel) and in U.S. Pat. No. 4,255,214 (Falconer Plate Glass Corporation).

The use of azole-based inhibitors has given a discernible improvement in preventing or retarding the appearance of haze by hindering the oxidation of the copper, and consequently also of any underlying layer of silver. It has however been established that even when such inhibitors are employed the problem of corrosion at the margins of the mirror has not been fully solved and could therefore lead in time to an unacceptable reflective quality.

SUMMARY OF THE INVENTION

The aim of the invention is to increase the mirror's resistance to corrosion, including corrosion at the margins.

According to the invention there is thus provided a mirror comprising a transparent glass sheet having a reflective metal coating deposited on the glass and a protective coating applied to the reflective coating, characterised in that the protective coating comprises a paint having a residual internal stress $S_R$ equal to or less than 1 MPa, measured by the Cantilever method (as defined herein) at a temperature above its glass transition temperature.

The invention also provides a method of manufacturing a mirror in which a reflective metal is first deposited on a glass sheet and a protective coating is then applied to the reflective metal, characterised in that a paint having a residual internal stress $S_R$ equal to or less than 1 MPa, measured by the Cantilver method (as defined herein) at a temperature above its glass transition temperature, is applied to form at least part of the protective coating.

We have most surprisingly discovered that by covering the mirror's metallic coating by a paint having a reduced internal level of stress a greatly increased resistance to corrosion is achieved.

Paint applied as a protective coating for a metallic coating on a mirror is generally deposited in liquid form and is baked on otherwise treated to evaporate any solvent and/or to promote cross-linking, and thus curing of the paint. One of the main characteristics which the paint is required to display is strong adhesion towards the metal. With the strongly adhesive paints employed hitherto, the curing of the paint and its continuing hardening over the course of time caused the build-up of significant internal stresses within the paint layer. These stresses often created defects in the finished mirror. Thus they tended to create fissures in the metallic coating and also to cause separation of the coating layers from each other. The separation occurred either as separation of paint from metal, separation of metal from glass or, if a composite structure of more than one metal were employed, for example a reflective layer of silver protected by a layer of copper, separation of the metallic layers from each other. The separation was most likely to ccur at the margins of the sheet. All of these effects also increased the likelihood of corrosion and more rapid ageing of the mirro. By ensuring that the paint applied to the metallic coating on a mirror, while displaying strong adhesion for the metal, also has a low residual stress as it approaches the fully cured condition, the present invention affords the advantage of much reduced internal stress at the paint/metal interface. The beneficial effects of the reduced stresses are most marked at the margins of the glass sheet. By avoiding fissures or layer spearation the invention dramatically increases the resistance of the mirror to ageing and considerably extends its life.

The Cantilever method employed according to this invention for measuring the residual internal stress of a paint is conducted by forming a strip of a flexible support material and applying a layer of the paint thereto. The so-coated strip is baked at 140° C. for 10 minutes. The internal stress of the finished strip is measured in air with a relative humidity of 5%. The finished strip, painted side uppermost, is supported horizontally by two parallel knife edges, each of these being located at an equal distance, designed lo, from the respective ends of the strip. The letter l designates the horizontal distance between the knife edges. The relative dimensions of lo and l are defined as lo=0.4564xl. With this location of knife edges the centre of the finished strip is deflected downwards by a distance designated d under the influence of the rsidual internal stresses within the paint layer. The distance d is measured automatically by a programmable micrometer.

The internal stress S is calculated from the following formula:

$$S = \frac{4d \cdot E_S \cdot t^3}{3 \cdot l^2 \cdot c(t+c)(1-V_S)} + \frac{4d \cdot E_C(t+c)}{l^2(1-V_C)}$$

in which formula:
d=deflection $E_S$ = elastic modulus of the strip
$E_c$ = elastic modulus of the paint coating
$V_S$ = Poisson coefficient of the strip
$V_c$ = Poisson coefficient of the paint coating
c = paint thickness
t = strip thickness, and
l = horizontal distance between the knife edges as defined above.

The formula assumes that the paint coating remains securely attached to the strip, that the elastic properties of the strip are isotropic and that the elastic limit of the strip is not exceeded during the test procedure.

In order to ensure that the hardened paint has a level of residual internal stress within the limits required by the invention attention must be paid to several different properties of the paint composition and to the materials employed in its preparation. The important properties include the glass transition temperature (Tg) and the hardness (measured for example on the Persoz hardness scale). The glass transition temperature is the temperature at which amaterial changes from a viscous or rubbery condition to a hard and relatively brittle condition. It is determined for the purposes of the present invention by plotting the values of internal stress S (measured by the Cantilever method defined above) as a function of temperature. The resultant curve shows a steep fall from high stress at low temperatures, flattening out to become substantially parallel to the temperature axis at high temperatures. The glass transition temperature is the temperature coordinate of the meeting point of asymptotes projected from respecitvely the steep fall portion and the flat portion. The residual internal stress $S_R$ which determines the suitability of a paint for use in a mirror according to this invention is the value of S from the equation above at a temperature which is 5° C. above the glass transition temperature or at 20° C., whichever is the higher.

According to the present invention the glass transition temperature (Tg) is preferably less than 35° C., most preferably less than 20° C. At these Tg values the paint remains resilient at ordinary temperatures and the internal stress remains weak.

The Persoz hardness referred to herein is determined by a Persoz pendulum test according to either of the standards ISO 1522 or AFNOR NFT 30-016. It is preferably less than 180 and advantageously is less than 150. This characteristic also contributes to a low residual internal stress of the paint and thereby reduces the interfacial stresses.

In achieving these desired properties the key factors in respect of the component materials of the paint composition include the pigmentary volume concentration pVC, the choice of binder and the specific additives present in the composition, for example siccative fatty acids added to assist drying of the paint.

The pigmentary volume concentration (pVC) is the volume of pigment relative to the volume of binder. There is an upper limit to this relative volume, known as the critical pigmentary volume concentration (CpVC), beyond which there is insufficient binder to cover all of the pigment and to maintain sufficient cohesion within the apint. The loss of continuity of binder surface over the pigment and the loss of cohesion within the paint which occur when the pVC reaches the CpVC can be observed under a microscope. For the purposes of the invention the pVC is preferably between 50 and 90% of the CpVC, most preferably near the upper limit of this range. These proportions of pigment also ensure that the paint can be easily cut at the time of shaping the mirrors, which represnts a further important advantage of the invention.

Preferred pigments include those based on lead, for example pigments containing lead sulphate and/or lead carbonate. In some circumstances, such pigments can augment the protection against chemical attack which is afforded by the paint layer.

The choice of binder is a major influence in determining the residual internal stress of the paint. Preferred binders for use in the present invention include acrylic, epoxy, cellulosic, phenolic and polyester resins, in particular alkyd resins.

The additives to which most attention must be given in order to ensure that the paint has the required properties are those which promote curing of the paint following its application. Thus the least possible quantity of chemical hardener should be added. In particular attention should be given to any components which take up ambient oxygen, for example siccative fatty acids which increase the hardness of paint over a period of time as a result of possessing double bonds oxidisable by ambient oxygen. The aim is to ensure that the finished paint presents substantially no reactivity towards oxygen. This reduces the post-manufacture hardening and thus further avoids increasing the residual internal stresses in course of time.

Specifically the binder preferably contains less than 30% fatty acid by weight and the fatty acid is preferably non-siccative. If the binder contains melamine formaldehyde, this should preferably be present ina proportion of less than 10% by weight.

The paint is conveniently applied by means of a curtain coating apparatus through which the glass sheet is conveyed at a controlled uniform speed and in a horziontal plane with the reflective metal coating uppermost and in which a continuous film curtain of paint falls under gravity, for example from an elongated slot at the base of a paint reservoir, to deposit a uniform layer of paint on the reflective metal coating.

It is advantageous in avoiding the development of stresses at the paint/metallic layer interface to ensure that the paint achievers its final strength as soon as possible after leaving any furnace employed in the mirror manufacturing process and that there is no residual solvent to escape from the paint after it is baked.

The reflective metal coating is preferably either formed of silver or copper employed alone or a composite layer of silver deposited on the glass with the copper deposited on the silver.

When the reflective metal coating is wholly formed of copper, or is formed of a layer of reflective metal other than copper and a layer of copper deposited thereon, an azole composition is preferably provided as an inhibitor to protect the copper against oxidation. Such a procedure is described and claimed in our patent specification GB 2 102 453. Particularly preferred examples of azole compositions are 5-amino tetrazoles, 3-amino-1,2,4-triazole, 7-aminoindazole and indazole. The azole composition can either be incorporated directly in the paint or be applied prior to the paint as a separate coating layer. It can conveniently be applied as a powder or as an alcoholic solution.

The presence of an azole composition in or adjacent the paint strongly increases the adhesion towards the metal layer of the paints generally used for protective coatings on mirrors. In producing mirrors not according to the invention this strong adhesion combined with the presence of stresses in the paint tends to be harmful to the mirror's resistance to corrosion, especially at the margins. According to the invention, however, an azole composition can be applied to the metal as a safeguard against oxidation but without causing stress build-up at the paint/metal interface and thus without creating marginal corrosion problems.

In a particularly useful embodiment of the invention there is deposited on the metallic layer an adhesive paint layer as defined and discussed above but followed by depositing a layer of another paint which is harder and thus more resistant to shocks and abrasion. In this embodiment if an azole composition is employed it is preferably applied prior to the deposition of the first paint layer. The composite structure of two such paint layers provides a mirror with a considerably improved combination of anti-aging and wear-resistant properties. The first paint layer absorbs the stresses existing in the superimposed hard paint layer and thereby avoids transmitting the stresses to the paint/metallic layer interface.

DESCRIPTION OF THE PREFERRED EMBODIMENTS

The invention is further described below with reference to examples of paint-coated mirrors. The mirrors were formed as follows.

A reflective silver layer of approximately 100 nm thickness was deposited on a glass sheet of 4 mm thickness using conventional chemical deposition on a silvering conveyor. A layer of copper of approximately 30 nm thickness was deposited on the silver so as to protect it. The copper layer was then given an azole-based inhibitor layer, being first sprayed with water and then sprayed with an aqueous solution of 5-aminotetrazole monohydrate which was allowed to react with the copper in air for a period of three minutes before being rinsed off. A layer of paint approximately 50 micrometers thick was then applied by a curtain coating apparatus. The paint was baked by conveying the coated sheet through a baking chamber in which the paint was raised to a temeprature of 140° C. in about 2 minutes and maintained at that temperature for about 5 minutes, and then allowed to cool to ambient temperature.

The examples illustrate mirrors prepared according to the above procedure and having paint layers of different specified compositions. Examples 1 to 3 illustrate mirrors having a paint composition falling within the scope of the invention. A comparative example is also included to show the inferior results obtained when using a paint composition outside the scope of the invention.

The proportions given for the paint constituents in the example are percentages by weight. In all examples (including the comparative example) the pigmentary volume concentration pVC was between 80 and 90% of the critical pigmentary volume concentration CpVC. The glass transition temperature and the residual internal stress of paint samples having the specified compositions were measured at a relative humidity of 5% by the methods specified above and the mirrors were subjected to a 500 hour accelerated weathering test ina saline mist accoridng to DIN standard 50021. This test is particularly suitable for revealing the resistance of a coating to marginal corrosion. The mean corrosion observed at the margins after the test is given for each example, expressed as the corroded distance from the margin towards the center.

EXAMPLE I

The paint used in coating the mirror had the following composition:
50% pigments:
  10% titanium dioxide
  45% barium sulphate
  25% talc
  15% lead pigment
  05% colouring pigment and carbon black,
15% binder
  90% alkyd resin with 28% non-siccative fatty acid: fatty acid of cotton and copra oil
  10% melamine-formaldehyde resin of the hexamethoxymethlmelamine type,
35% solvents
  05% butanol and isobutanol
  951 % xylene The glass transition temperature of the paint was approximately 20° C., the residual internal stress at 25° C. was approximateyl 0.1 MPa and the Persoz hardness was approximately 140.

The mirror had a mean marginal corrosion after weathering of about 0.5 mm.

EXAMPLE II

The paint used in coating the mirror had the following composition:
50% pigments:
  10% titanium dioxide
  45% barium sulphate
  25% talc
  15% lead pigment
  05% colouring pigment and carbon black,
15% binder
  85% alkyd resin with 30% synthetic fatty acid oil
  15% melamine-formaldehyde resin of the hexamethoxymethlmelamine type,
35% solvents
  05% butanol and isobutanol
  951 % xylene The glass transition temperature of the paint was approximately 25° C., the residual internal stress at 30° C. was approximateyl 0.5 MPa and the Persoz hardness was approximately 180.

The mirror had a mean marginal corrosion after weathering test of approximately 1.0 mm.

EXAMPLE III

The paint used in coating the mirror had the following composition:
50% pigments:
  10% titanium dioxide
  45% barium sulphate
  25% talc
  15% lead pigment
  05% colouring pigment and carbon black,
15% binder
  100% epoxy resin ester with 45% castor oil
35% solvents
  05% butanol and isobutanol
  951 % xylene The glass transition temperature of the paint was approximately 10° C., the residual internal stress at 20° C. was approximateyl 0.05 MPa and the Persoz hardness was approximately 120.

The mirror had a mean marginal corrosion after weathering of approximately 0.1 mm.

COMPARATIVE EXAMPLE

The paint used in coating the mirror had the following composition:

45% pigments:
  10% titanium dioxide
  25% dolomite
  45% barium sulphate
  25% talc
  05% colouring pigment and carbon black,
20% binder
  75% alkyd resin with 50% content of dehydrated castor oil, modified by addition of collophane
  25% high reactivity urea formaldehyde resin
35% solvents
  10% butanol and isobutanol
  20% white psirit
  701 % xylene The glass transition temperature of the paint was approximately 30° C., the residual internal stress at 35° C. was approximately 2.0 MPa and the Persoz hardness was approximately 210.

The mirror had a means marginal corrosion after the weathering test of approximatley 5.0 mm.

What is claimed is:

1. A mirror, comprising:
   a glass sheet which is transparent;
   a reflective metal coating deposited on at least one surface of the glass sheet; and
   a protective coating applied to the reflective metal coating and comprising a paint which has a glass transition temperature of less than 35° C. and which has a residual internal stress $S_R$ equal to or less than 1 MPa when measured by a Cantilever method as defined herein 20° C. or at at a temperature which is 5° C. above its glass transition temperature whichever is higher, at which temperature a curve of internal stress as a function of temperature becomes substantially parallel to the temperature axis whereby said mirror shows a means marginal corrosion of no more than about 1.0 mm when subjected to a saline mist test as described herein.

2. The mirror as claimed in claim 1, wherein the paint has a glass transition temperature of less than 20° C.

3. The mirror as claimed in claim 1, wherein the paint has a pigmentary volume concentration which is close to but slightly less than a critical pigmentary volume concentration.

4. The mirror as claimed in claim 1, wherein the paint has a pigmentary volume concentration which ranges between 50% and 90% of a critical pigmentary volume concentration.

5. The mirror as claimed in claim 1, wherein the paint has a Persoz harndess of less than 180.

6. The mirror as claimed in claim 1, wherein the paint has a Persoz hardness of less than 150.

7. The mirror as claimed in claim 1, wherein the paint includes a binder selected from the group consisting of polyester, acrylic, epoxy, cellulosic and phenolic resins.

8. The mirror as claimed in claim 1, wherein the paint includes a binder containing less than 30% by weight of fatty acid.

9. The mirror as claimed in claim 1, wherein the paint includes a binder containing a non-siccative fatty acid.

10. The mirror as claimed in claim 1, wherein the paint includes a binder containing less than 10% by weight of melamine formaldehyde.

11. The mirror as claimed in claim 1, wherein the paint presents substantially no reactivity towards oxygen.

12. The mirror as claimed in claim 1, wherein the reflective metal coating is formed of a material selected from the group consisting of silver, copper and a composite layer of copper deposited on silver.

13. The mirror as claimed in claim 1, wherein the reflective metal coating is selected from the group consisting of a layer of copper and a layer of a reflective metal other than copper and a layer of copper deposited on the reflective metal other than copper, and wherein an azole composition is applied to the copper.

14. The mirror as claimed in claim 13, wherein he azole composition is selected from 5-amino tetrazole, 3-amino-1,2,4-triazole, 7-aminoindazole and indazole.

15. The mirror as claimed in claim 13, wherein the azole composition is incorporated in the paint.

16. The mirror as claimed in claim 13, wherein the azole composition is applied as a separate coating layer.

17. The mirror as claimed in claim 1, wherein the paint comprises a first paint and a second paint, and wherein a layer of the second paint is superimposed on a layer of the first paint, said layer of the second paint being harder than said layer of the first paint.

18. A method of manufacturing a mirror comprising:
   depositing a reflective metal coating on a glass sheet; and
   applying a protective coating to the reflective metal coating which is comprised of a paint having a glass transition temperatur eof less than 35° C., and having a residual internal stress $S_R$ equal to or less than 1 MPa when measured by a Cantilever method as defined ehrein at 20° C. or at a temperature which is 5° C. above its glass transition temperature whichever is higher, at which temperature a curve of internal stress as a function of temperature becomes substantially parallel to the temperature axis whereby a mirror thus produced shows a mean marginal corrosion of no more than about 1.0 mm when subjected to a saline mist test as described herein.

19. The method as claimed in claim 18, wherein the reflective metal coating is selected from the group consisting of a layer of copper and a layer of a reflective metal other than copper and a layer of copper deposited on the other metal, and wherein the method further comprises depositng an azole composition on the copper prior to applying the paint.

20. The method as claimed in claim 18, wherein the paint is applied by means of a curtain coating apparatus including the steps of conveying the glass sheet at a controlled uniform speed and in a horizontal plane through the curtain coating apparatus with the reflective metal coating uppermost, and depositing a uniform layer of paint on the reflective metal coating by causing a continuous film of paint to fall on the reflective metal coating under the influence of gravity.

21. The method as claim 18, wherein the method further comprises baking the paint in a furnace and wherein the paint applied achieves its final strength after leaving the furance within the time needed to cool the mirror to room temperature.

* * * * *